US009639458B2

(12) United States Patent
Kogge

(10) Patent No.: US 9,639,458 B2
(45) Date of Patent: May 2, 2017

(54) REDUCING MEMORY ACCESSES FOR ENHANCED IN-MEMORY PARALLEL OPERATIONS

(71) Applicant: Emu Solutions, Inc., South Bend, IN (US)

(72) Inventor: Peter M. Kogge, Granger, IN (US)

(73) Assignee: EMU SOLUTIONS, INC., South Bend, IN (US)

( * ) Notice: Subject to any disclaimer, the term of this patent is extended or adjusted under 35 U.S.C. 154(b) by 183 days.

(21) Appl. No.: 14/493,744

(22) Filed: Sep. 23, 2014

(65) Prior Publication Data

US 2015/0089166 A1    Mar. 26, 2015

Related U.S. Application Data

(60) Provisional application No. 61/882,697, filed on Sep. 26, 2013.

(51) Int. Cl.
*G06F 12/02* (2006.01)

(52) U.S. Cl.
CPC ........ *G06F 12/0207* (2013.01); *G06F 12/023* (2013.01); *G06F 2212/251* (2013.01); *Y02B 60/1225* (2013.01)

(58) Field of Classification Search
CPC ... Y02B 60/1225; G06F 12/02; G06F 12/023; G06F 3/0622; G06F 9/3851; G06F 2212/206; G06F 12/0207; G06F 12/0806; G06F 2212/1016; G06F 2212/1028; G06F 2212/2515; G06F 2212/253
See application file for complete search history.

(56) References Cited

U.S. PATENT DOCUMENTS 5,109,497 A  *  4/1992  Bolstad ............... G06F 13/1605
                                                       711/200
6,163,836 A  *  12/2000  Dowling ............... G06F 9/3001
                                                       712/209

OTHER PUBLICATIONS

Batcher, "Design of a Massively Parallel Processor" IEEE Transactions on Computers, vol. C-29, No. 9, Sep. 1980, pp. 836-840.
Hall et al., "Mapping Irregular Applications to DIVA, a PIM-based Data-Intensive Architecture" Proceedings of the ACM/IEEE Conference, 1999, 18 pages.
Kirsch, "Active Memory: Micron's Yukon" Proceedings of the International Parallel and Distributed Symposium, IEEE, 2003, 11 pages.

(Continued)

*Primary Examiner* — Zhuo Li
(74) *Attorney, Agent, or Firm* — Gesmer Updegrove LLP

(57) ABSTRACT

A memory storage system is that includes a memory element having a memory address for a physical memory. A memory controller receives a command for accessing the memory element using a program-generated address and dynamically transforms the program-generated address into the memory address for the physical memory using a rotation module and configuration information. A data word accessed by the physical address is then provided to a set of arithmetic logic units (ALUs) where multiple computations are performed simultaneously so as top reduce program execution time and energy. The configuration information provided to the rotation unit configures the set of ALUs.

18 Claims, 11 Drawing Sheets

(56) References Cited

OTHER PUBLICATIONS

Lipovski et al., "The Dynamic Associative Access Memory Chip and its Application to SIMD Processing and Full-text Database Retrieval" IEEE, 1999, pp. 24-31.
Thoziyoor et al., "PIM lite: a multithreaded processor-in-memory prototype" 2005, 6 pages.
Kogge et al., "Real Time Artificial Intelligence System" IEEE, 1995, pp. 433-445.
Gokhale et al., "Processing in Memory: The Terasys Massively Parallel PIM Array" IEEE, Apr. 1995, pp. 23-31.
Blank, "The MasPar MP-1 Architecture" IEEE, 1990, pp. 20-24.
Tucker et al., "Architecture and Applications of the Connection Machine" IEEE, 1988, pp. 26-35.
Reddaway, "DAP—A Distributed Array Processor" ISCA Proceedings of the 1st annual symposium on Computer architecture 1973, pp. 61-65.

\* cited by examiner

| Row | | | | | | | | |
|---|---|---|---|---|---|---|---|---|
| 3 | A[6].2 | A[6].3 | A[7].1 | A[7].2 | A[7].3 | A[8].1 | A[8].2 | A[8].3 |
| 1 | A[3].3 | A[4].1 | A[4].2 | A[4].3 | A[5].1 | A[5].2 | A[5].3 | A[6].1 |
| 0 | A[1].1 | A[1].2 | A[1].3 | A[2].1 | A[2].2 | A[2].3 | A[3].1 | A[3].2 |

| Row | | | | | | | | |
|---|---|---|---|---|---|---|---|---|
| 3 | A[0].3 | A[1].3 | A[2].3 | A[3].3 | A[4].3 | A[5].3 | A[6].3 | A[7].3 |
| 1 | A[0].2 | A[1].2 | A[2].2 | A[3].2 | A[4].2 | A[5].2 | A[6].2 | A[7].2 |
| 0 | A[0].1 | A[1].1 | A[2].1 | A[3].1 | A[4].1 | A[5].1 | A[6].1 | A[7].1 |

30

A[i].j is the j'th field of element i

FIG. 6

| Row | A[0].hi | A[1].hi | A[2].hi | A[3].hi | A[4].hi | A[5].hi | A[6].hi | A[7].hi |
|---|---|---|---|---|---|---|---|---|
| 3 | A[0].hi | A[1].hi | A[2].hi | A[3].hi | A[4].hi | A[5].hi | A[6].hi | A[7].hi |
| 1 | A[0].mid | A[1].mid | A[2].mid | A[3].mid | A[4].mid | A[5].mid | A[6].mid | A[7].mid |
| 0 | A[0].low | A[1].low | A[2].low | A[3].low | A[4].low | A[5].low | A[6].low | A[7].low |

FIG. 7

US 9,639,458 B2

REDUCING MEMORY ACCESSES FOR ENHANCED IN-MEMORY PARALLEL OPERATIONS

PRIORITY INFORMATION

This application claims priority from provisional application Ser. No. 61/882,697 filed Sep. 26, 2013, which is incorporated herein by reference in its entirety.

BACKGROUND OF THE INVENTION

The invention is related to the field of memory storage and retrieval, and in particular reducing memory accesses for enhanced in-memory parallel operations.

Performing simple operations on elements of an array stored in memory is an important component of many computer applications. One example is search—looking for all elements that match some value according to some criteria. Today such operations require fetching large amounts of data from memory, and transferring it over electrically long distances into the cache hierarchies of modern processor cores, where it is looked at once and thrown away. Furthermore, very often only a small part of the data actually fetched is looked at and the rest ignored. In total, this wastes both time and power.

Over the last few decades a variety of computing systems and chips have been designed with computational units positioned very close to the memory so that such long distance transfers can be avoided and data looked at as soon as it is read from memory. This reduces the need to transfer data, but still suffers from excess data reads that are not always used. Alternatives have "rotated" the components of a data field so that they extend "vertically" into the memory rather than "horizontally" as in common memories. When there are large numbers of such array elements to process this can greatly reduce the wasted memory reads, but complicates the loading and storing of individual items in such data. Also current designs provide no programmability in the configuration of such architectures.

SUMMARY OF THE INVENTION

According to one aspect of the invention, there is provided a memory storage system. The memory storage system includes a memory element having a memory address for a physical memory. A memory controller receives a command for accessing the memory element using a program-generated address and dynamically transforms the program-generated address into the memory address for the physical memory using a rotation module and configuration information. A data word accessed by the physical address is then provided to a set of arithmetic logic units (ALUs) where multiple computations are performed simultaneously so as to reduce program execution time and energy. The configuration information provided to the rotation unit configures the set of ALUs.

According to another aspect of the invention, there is provided a method of performing memory management. The method includes providing a memory element that includes a memory address for a physical memory. Also, the method includes implementing a memory controller that receives a command for accessing the memory element using a program-generated address and dynamically transforms the program-generated address into the memory address for the physical memory using a rotation module and configuration information. A data word accessed by the physical address is then provided to a set of arithmetic logic units (ALUs) where multiple computations are performed simultaneously so as to reduce program execution time and energy. The configuration information provided to the rotation unit configures the set of ALUs.

BRIEF DESCRIPTION OF THE DRAWINGS

FIG. 5 is a schematic diagram illustrating an array with 3 D-bit fields per array element arranged in sequential memory words;

FIG. 6 is a schematic diagram illustrating an array with 3 D-bit fields per array element rotated vertically across 3 rows;

FIG. 7 is a schematic diagram illustrating an array with a single 3D-bit field per array element stacked vertically across 3 rows;

DETAILED DESCRIPTION OF THE INVENTION

The invention describes a programmable mechanism whereby the "degree of rotation" of such data can be selected on a per application basis to best balance overall performance. This is done by manipulating in a simple way the addresses presented to the memory to access such data structures. The invention also defines how, for operations such as search, additional energy can be saved by suppressing parts of the access when it is known that they are no longer needed. The "degree of rotation" in such a system refers to the extent in which data for a single field in an array or similar data structure is stored not in consecutive bits in the physical memory but in bits of different rows.

Figure 1:
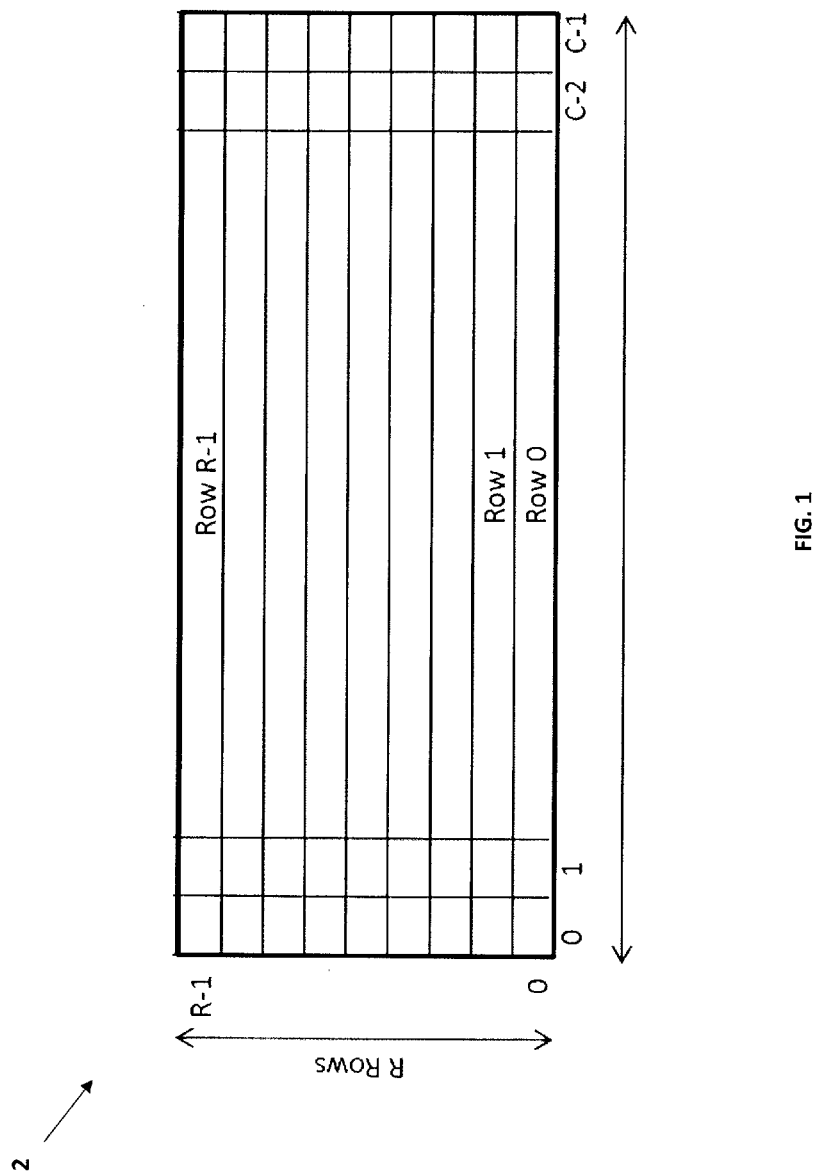
FIG. 1 is a schematic diagram illustrating a basic memory structure used in accordance with the invention.

FIG. 1 diagrams an abstracted view of a typical memory block 2 such as found on a modern DRAM memory chip. There are R rows of C memory bits, for a total of RC bits of memory. It is not uncommon for R and C to each be in the thousands.

Figure 2:
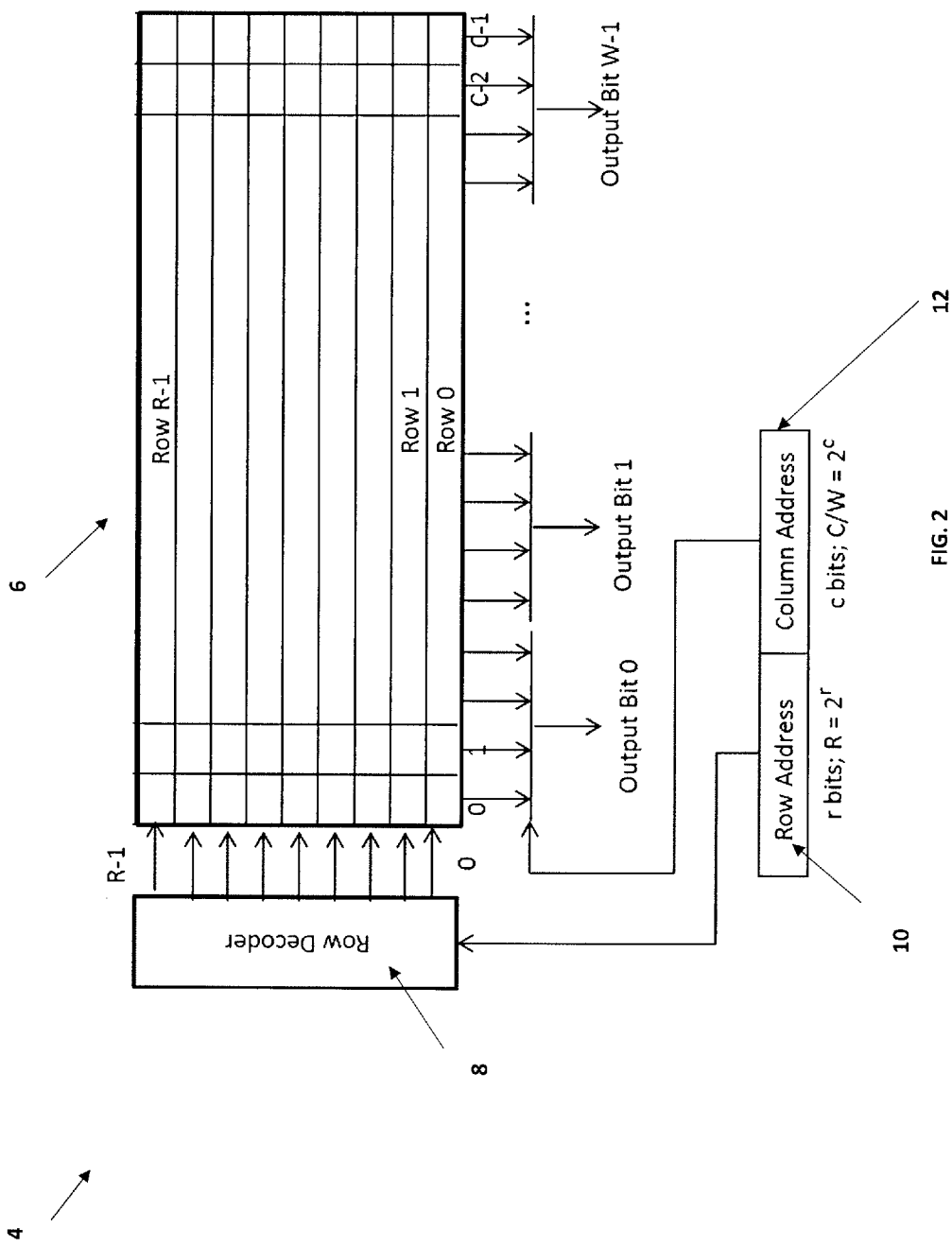
FIG. 2 is a schematic diagram illustrating addressing a typical memory.

FIG. 2 diagrams the typical use of such a block as a memory 4 where each "word" presented to the outside world is W bits wide. For a memory of RC bits there are RC/W such words. A word address with $\log_2(RC/W)$ bits is divided into two pieces. The "row address" 10 of $\log_2(R)$ bits is presented to some decoder logic 8 which in turn selects exactly one of the rows of the memory 4. This selection is a signal that propagates to all C memory cells in that row, and activates them to present their data to C vertical column signals that exit the memory. Very often there are "sense amplifiers" and other electronics at the bottom of each column to convert the signal to some standard. At the bottom of the memory are W multiplexors, each of which accept C/W column signals and output a single data bit. The "column address" 12 of the presented word address, $\log_2$(W/C) bits long, drives all of these multiplexors to select the same relative input. Similar logic is used to selectively write W bits of data into only the correct columns when a word write is desired.

Figure 3:
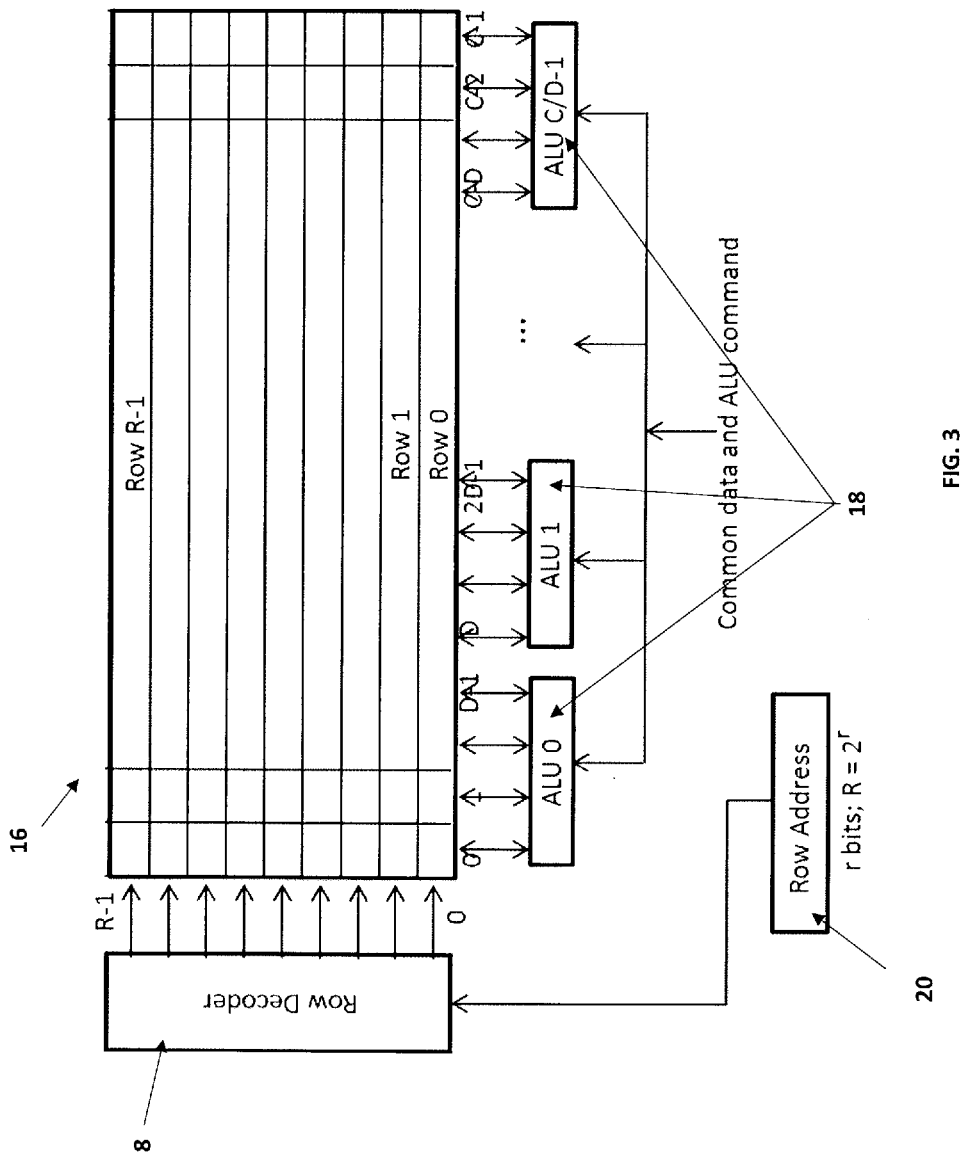
FIG. 3 is a schematic diagram illustrating the positioning of ALUs on the column outputs.

When C is in the thousands and W is in the range of 4 to 32, it is obvious that a potentially very large fraction of the data that is accessed is not used. To avoid this inefficiency, a variety of computers were developed where simple arithmetic/logical units (ALUs) 18 are positioned at the outputs of the columns of the memory, as pictured in FIG. 3. In this figure, a distinct set of D of the columns go to each ALU 18 for a total of C/D ALUs 18. Inputs to such a memory 16 now consist of just a row address 20, some common data, and a command. The row address 20 goes to the row decoder 8 as before. The common data and command are broadcast to all ALUs 18 where they operate independently on their individual D bits from the selected row. Examples of computers with these characteristics include the DAP, the Goodyear MPP, the Thinking Machines CM-1 and CM-2, the MASPAR, and the RTAIS. Memory chips that incorporated such functionality included the TERASYS, the Linden DAAM, DIVA, Micron Yukon, and the PIM Lite. In nearly all of these cases the width of the individual ALUs is between 1 and 8 bits.

In such cases, "consecutive" words are in consecutive D bits of a row, with the "next" word after the rightmost one in a row being the leftmost D bits in the next row.

When an array is longer than C/D elements long, additional row accesses can return C/D elements per access.

There are at least two obvious uses for such a capability: "signal processing" such as for multi-media where each D-bit value is a pixel or sound value, and doing searches for an entry that "matches" some provided value. Several of the above-referenced systems were designed explicitly for one or the other.

Reading and writing individual D-bit words one at a time into this memory is similar to FIG. 2, except that the "column address" of $\log_2$(C/D) bits selects a word of D bits from D consecutive bits from the memory as aligned with the ALUs.

Figure 4:
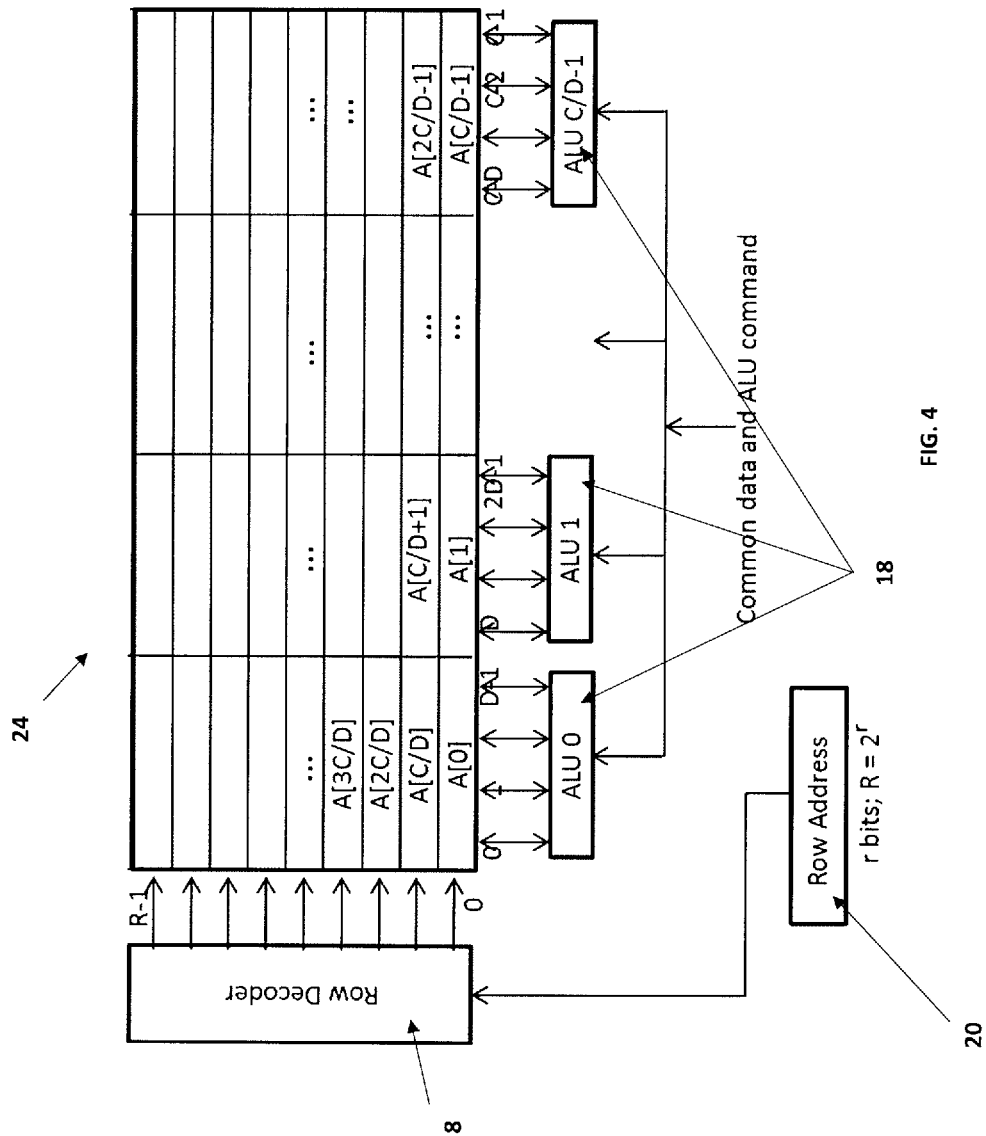
FIG. 4 is a schematic diagram illustrating the processing of multiple array items at a time.

When the data stored in the memory is a 1-dimensional array of N elements where every element A[0] to A[N−1] is a simple field of D bits (matching the width of the ALUs), then a single row access can access and apply a common operation to C/D elements of the array at a time, as pictured in FIG. 4, with complete efficiency.

There are, however, many cases where either the array is multi-dimensional or each array element is a data structure with multiple fields. An example of the latter may be a set of "key-value" pairs as found in MapReduce applications. In such cases, if the "fields" of each such array element are D bits each, and if they are found in consecutive D-bit words of memory, then when attempting to process the same field of multiple array elements in parallel, a structure such as FIG. 4 again does not utilize all the C bits read out of the memory at a single row access. If there are F D-bit fields in an array element, then on average only C/F bits are used from each row access. Out of each F ALUs, only 1 of them is doing useful work. For example, in FIG. 5 there are 3 fields in an array element 28, and enough space in one row for 8 fields. The average row access can thus process only ⅜=37.5% of the data it reads. Updating all 3 fields of an individual array element requires writing to 3 consecutive words in memory, which most often is to the same row.

A common approach to increasing the efficiency of such systems is to "rotate" the fields of each element 30 up through the vertical columns as pictured in FIG. 6. Now all C/D ALUs can be active on the same field from C/D separate array elements from a single row access.

However, now updating all F fields of an individual array element requires writing to F separate rows, which is a time-consuming process. In addition, the code that is performing the update must know the hardware-based C and D parameters so that it can properly compute the address of the later fields from that of the first.

A similar problem occurs when the width of the array element, or of a field in the array element, exceeds D bits. If there is only one field per element and if the width of that fields is a multiple of D bits, then D consecutive ALUs can be ganged together, typically by passing carry and status signals. Again all bits from a row access are used, but for a fewer number of array elements.

A second solution to this is similar to FIG. 6, by vertically stacking the D-bit pieces of each field. FIG. 7 diagrams an arrangement where each array element 32 is a single 3D-bit field in width. One row reference would be needed to process the lowest D bits of each of the C/D elements. A second is needed for the middle D bits, and a third is needed for the most significant D bits. The ALUs would need to keep intermediate status between the $1^{st}$ and $2^{nd}$ row accesses, and between the $2^{nd}$ and $3^{rd}$ accesses.

Updating a single field now requires computing different, non-sequential, addresses for each piece of the field, much as for FIG. 6.

An obvious variant is where each array element has multiple fields, each of which is a different multiple of D bits wide. A vertical stacking approach again maximizes the utilization of all bits from each access, but at a cost of some non-trivial address computations when a single element access is to be performed.

Many of the earlier referenced systems and chips mentioned above used this latter approach, especially those systems that had 1-bit wide ALUs 18. This was particularly true of the RTAIS system of FIG. 8, which had a controller 38 positioned inside the memory 36. This controller 38 accepted a starting address of an array, the properties of the array (field width and type), and the operation to be performed. It then did all the address arithmetic to manage the computation and command the ALUs on a step by step basis using ALU command signal 42.

In addition, a status signal 40 back from the ALUs 18 was particularly useful for searching through an array for entries that matched in some programmable way a particular pattern of data provided as input. When the data field being compared was some multiple of D, the status signal that came back on a cycle by cycle basis indicated whether or not there were still any of the C/D elements that had not as yet failed the test. As soon as there were no remaining possible matches, the test of this set of records was stopped, regardless of how many D-bit pieces were yet to be tested, and processing could move up to a fresh set of C/D records. In many situations this could halve or better the number of row accesses, and thus bits accessed. The controller also handled all address computations that updated individual fields.

To date all such systems have had fixed parameters for C and D, and have required application software to be aware of those parameters and how data must be laid out so as to use these facilities, and to know how to compute the address of individual values on a step-by-step basis based on those parameters.

This invention presents a method to dynamically configure the addressing parameters of a memory with local ALUs so as to provide a single consistent view of memory to an application, and yet reconfigure how arrays are laid out so as to best minimize memory accesses, and thus reduce overall execution time and power.

The invention assumes that an application program wishes a single view of memory for potentially very large, multi-field arrays where each element, including all fields that may make up that element, are to be laid out in consecutive memory locations. Most modern computers use byte-significant addresses, meaning that each unique address signals an 8-bit quantity. By a single view is meant that data is laid out by address in sequential logical memory locations, without having to have different fields and/or parts of words scattered about. even though in reality the data may be so scattered so as to maximize the efficiency of memory-local ALUs.

Figure 9:
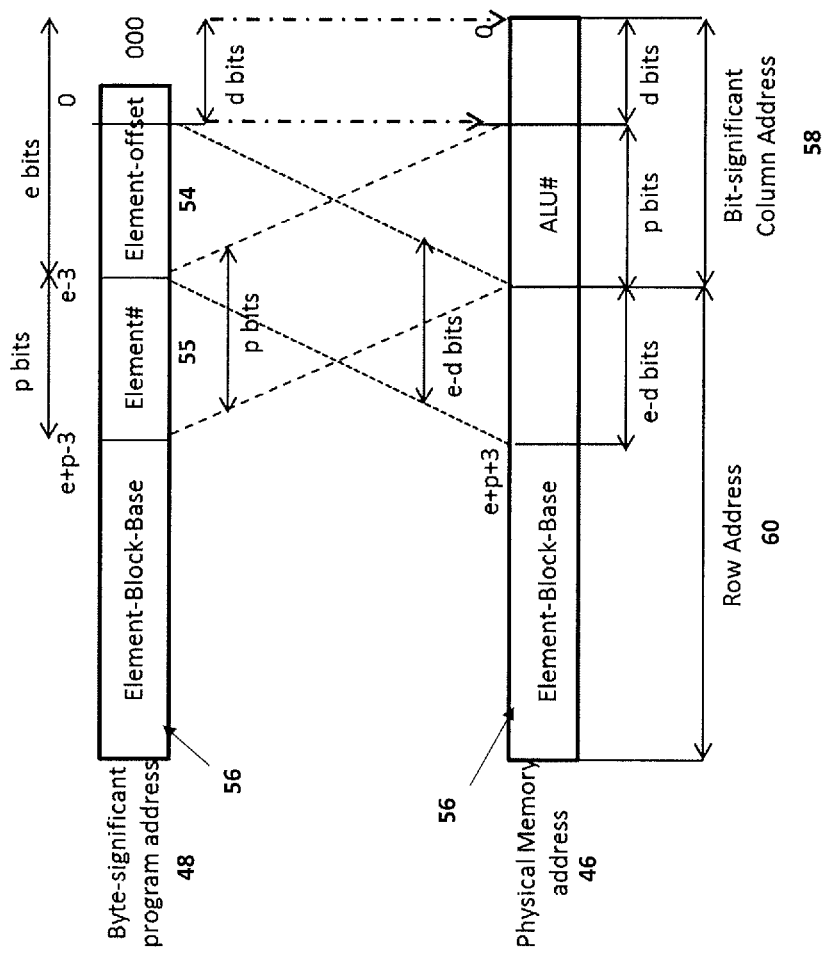
FIG. 9 is a schematic diagram illustrating a rotated address translation as practiced by this invention.

FIG. 9 diagrams how an address as created by a program with such a sequential view may be converted into a physical address 46 with the desired efficiencies. For explanatory purposes the diagram makes the following assumptions:

C=the number of bit columns in the memory array being addressed; equivalent to the number of bits in a single row. This is fixed at the time the memory is manufactured.

D=the digit size in bits of each ALU at the bottom of the memory. This is also fixed at the time the computer is fabricated. D must divide evenly into C.

$E=2^e$=the number of bits in all values and fields of a single array entry. This is defined by the application. For explanatory purposes it is assumed E is a power of 2 and an integral multiple of D. Thus e is the number of address bits that are needed to distinguish between all bits in an element 54 if the address were bit-significant (for a conventional byte-significant address 58 we would need only e-3 bits).

N=the number of elements in the array, and is assumed to be much larger than C/D so that processing all elements requires multiple iterations of processing C/D at a time.

K=the number of physical ALUs to be ganged together to form a single logical ALU for use in the application's operations against the array.

$D'=KD=2^d$=the number of bits in each logical ALU, and equals the effective physical word size in bits to be assumed when accessing the memory in the rows holding the array. The value d matches the number of address bits needed to select one of the bits of a word of length D' bits.

$P=2^P$=C/D' equals the number of logical ALUs, and the number of "words," that are contained in each row of C bits. Thus PD'=C, and p is the number of bits of address needed to distinguish between logical words in a row.

For example, for a C of 2048, a D of 8o, a D' of 16, and an E of 256 bits (32 bytes), e is 8, d is 4, P is 128 and p is 7.

In FIG. 9, it is assumed that all program generated addresses are byte-significant, as shown by the byte-significant address 48, that is they assume a starting bit position that is a multiple of 8, and may be converted into a bit address by appending three "0"s as shown.

Thus from the standpoint of a program-generated address, the lower e-3 address bits (for a byte-significant address), also called the element offset 54, represent a byte within an element 55, and the next p address bits represent the relative element number within a block of P elements 56. The rest of the address bits identify a specific element block.

To rotate the address for use with the physical memory 48, the p bits of program-provided address are appended to the unchanged d lowest bits of the program-provided address. This specifies the starting bit position for the desired D' bit word in a row (remember that $2^p*2^d$=C). Then the e-d bits just above the lowest d bits of the address are placed just to the left of the above p+d bits, and the remaining address bits from the program-provided address (identified as "Element-Block-Base" 56 in FIG. 9) are appended to the left of the e–d bits.

Figure 10:
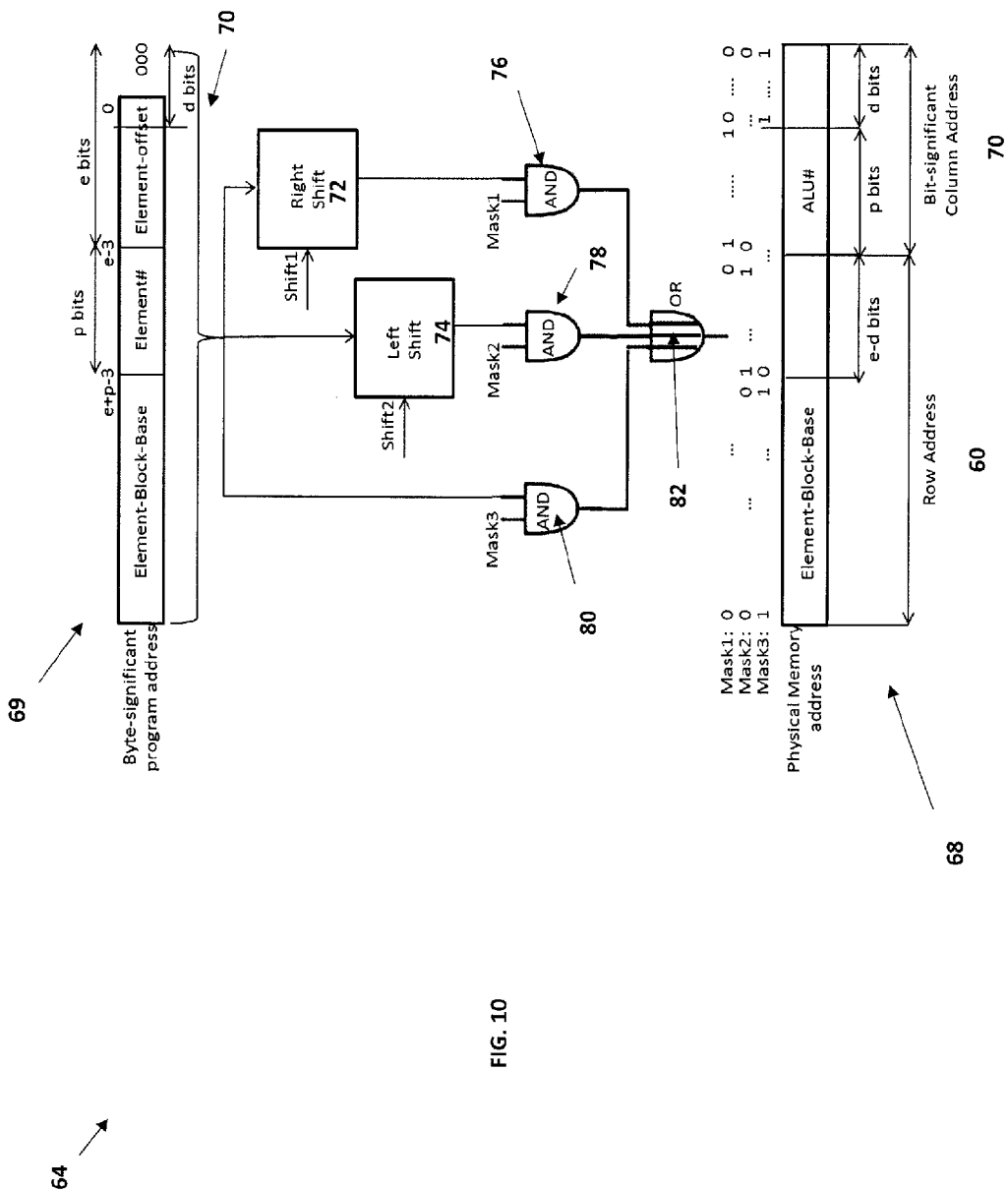
FIG. 10 is a schematic diagram illustrating a suite of steps that may be performed in the process of translating an address.

FIG. 10 presents one possible implementation 64 for the translation process described above. The address 69 generated by the program is expanded to be a bit-significant address 70 by appending 0s' to the right of the address. This address is then passed through a right-shifter 72 that shifts the address by an amount Shift1=e–d bit positions. The bit mask labeled Mask1 has 0s' in all bit positions except from bit d to bit d+p–1, so that after the shift the AND 76 will leave only as non-zero the p bits labeled "ALU#" in the physical address 68. The original address 70 also passes through a left shifter 74 by an amount Shift2=p bit positions, and passed through another AND 78 with Mask2 that has 0s in all positions except p+d through e+p–1. Next, the original address 70 is passed through an AND 80 with a Mask3 that has 1 s in all positions except between bits d and e+p–1. Forming an address is then the logical OR 82 of the output of the three ANDs. Those skilled in the art will recognize that other implementations are possible that perform the same function.

Figure 8:
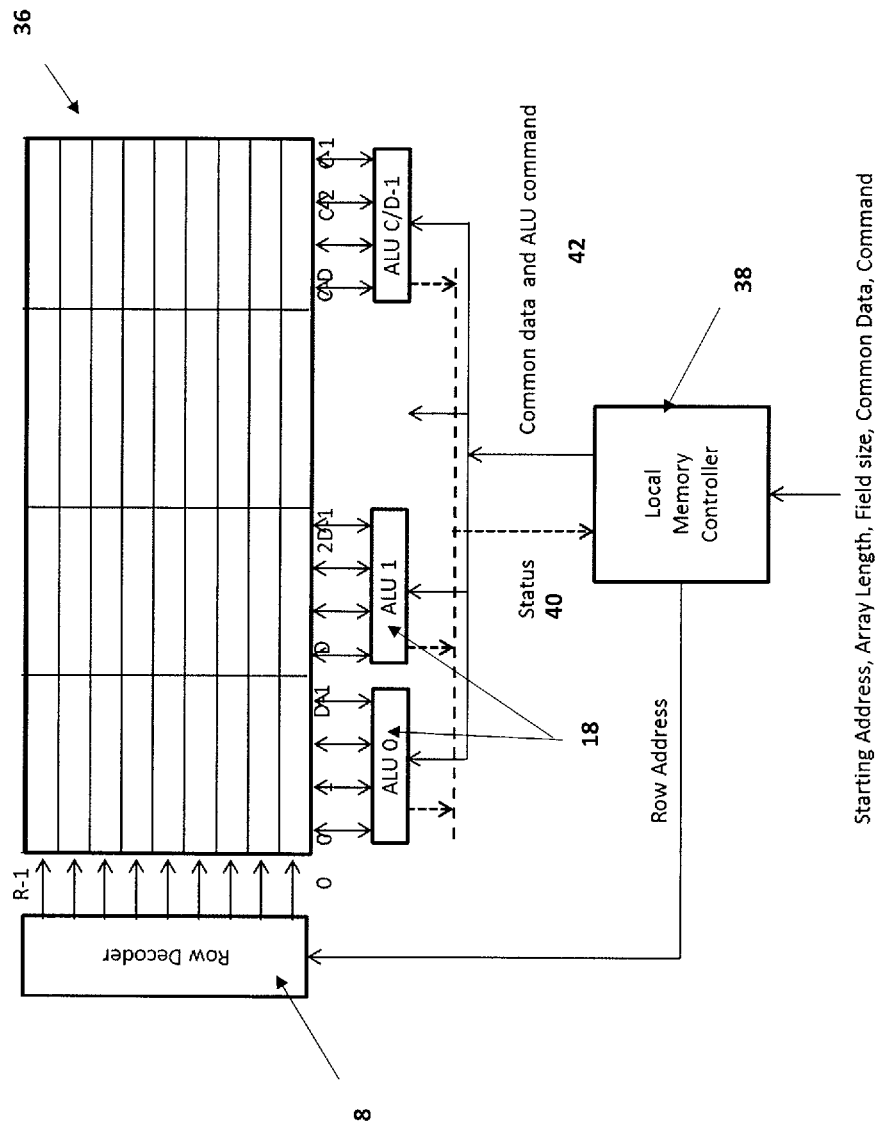
FIG. 8 is a schematic diagram illustrating the architecture of an RTAIS like system with a local memory controller.
Figure 11:
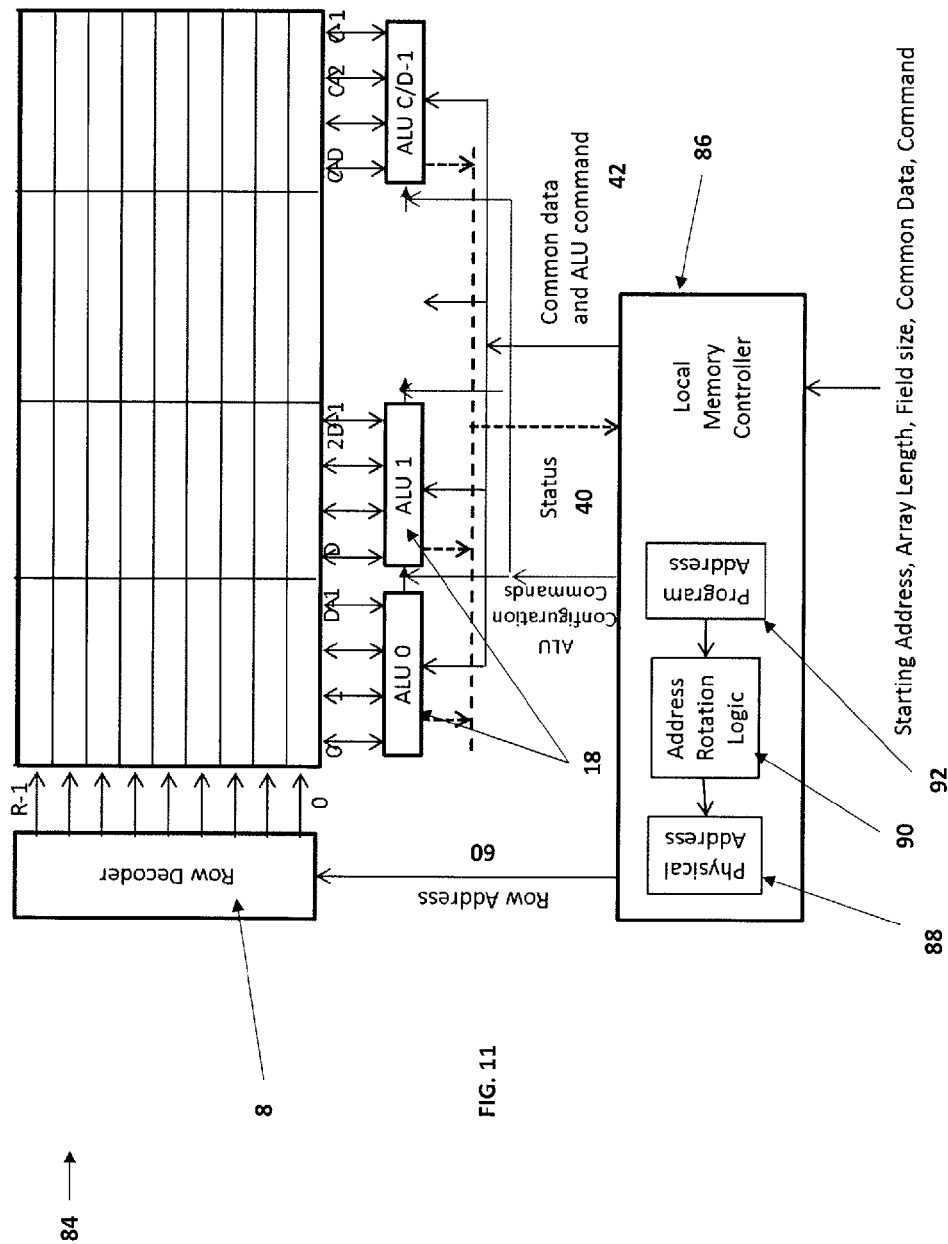
FIG. 11 is a schematic diagram illustrating a possible implementation of the presented translation mechanism.

FIG. 11 now places an implementation 84 such as FIG. 10 within the context of FIG. 8. Now, when an operation is to be performed over a set of P elements, the starting address of the lowest array element in the set is rotated as above, and the part labeled "Row Address" 60 is then presented to the memory. Again, those skilled in the art will recognize that other implementations are possible that perform the same function.

In a system such as FIG. 11, if a request to do a single load or store to an element stored in memory, the memory controller would translate the address as in FIG. 10, and then transfer the first D' bits between memory and the requestor, using the column address 70 determined in FIG. 10 to position the data correctly within the specified range. The row address would then be incremented repeatedly, transferring D' bits at a time until the entire transfer is performed. Moreover, a local memory controller includes various modules 88-92 used in performing the invention. The memory controller receives the program-provided address 88 that include the row address and provides this information the address rotation logic 90. The address rotation logic 90 performed the novel rotation technique described in FIG. 10 and produces the calculated physical address 88 formed in accordance with the invention.

This invention has the potential to make the choice of K (and thus d and D') a program-specifiable option. A small value of K (such as 1) maximizes the number of elements that can be touched in one row access, but extends the number of row accesses needed to load or store a single value. A small value of K may also have a second positive effect on searches by allowing row accesses to be stopped as soon as all elements in a row are known to have failed the test. On the other hand, a large value of K speeds up loads and stores of single values while reducing the number of elements that may be checked in a single row access. The ability to select K can thus take advantage of knowledge about the relative frequency of random single word loads and stores versus multi-word parallel operations.

The process of going from a selected K value to the shifts and masks needed by FIG. 10 can be implemented in several ways. First, a program could explicitly set each of them.

Alternatively, there could be a table kept in the memory controller of FIG. 11 that is indexed by K and returns the appropriate values for that K. A K value of 0 may be used to select parameters that provides no rotations, that is memory addresses are unmodified from normal practice, and then the memory acts as in FIG. 2. Those skilled in the art will recognize that other implementations are possible that perform the same function.

A computer architect has several options on how to make a new value of K visible to the hardware. It could be done explicitly by special instructions in a program before it makes references to an area of memory where such translation is to be employed. Alternatively, for systems with virtual memory, a K value could be included in the virtual page information, and set differently on a page-by-page or segment basis, so that an application may be totally unaware of what value is in force when as it executes its program.

Finally, in addition to reducing energy expended in the memory by reducing row accesses, this technique could be merged with other techniques to minimize accesses to columns when their values are not needed, such as when loading or storing a single values and/or when performing a search and the ALU for one set of columns has decided that the element it is handling has failed and no further checks need be made.

Although the present invention has been shown and described with respect to several preferred embodiments thereof, various changes, omissions and additions to the form and detail thereof, may be made therein, without departing from the spirit and scope of the invention.

What is claimed is:

1. A memory storage system comprising:
   a memory element that includes a memory address for a physical memory; and
   a memory controller that receives a command for accessing the memory element using a program-generated address and dynamically transforms the program-generated address into the memory address for the physical memory using a rotation module and configuration information, wherein a data word accessed by the physical address is then provided to a set of arithmetic logic units (ALUs) where multiple computations are performed simultaneously so as to reduce program execution time and energy, the configuration information provided to the rotation unit configures the set of ALUs, wherein the rotation module takes a relative element number of the program-generated address and appends it to an unchanged section of lowest bits of the program-generated address.

2. The memory storage system of claim 1, wherein the set of ALUs are selected in a program-specifiable option.

3. The memory storage system of claim 1, wherein the memory controller maintains a table that is indexed by the number of the set of ALUs used.

4. The memory storage system of claim 1, wherein the memory controller uses a translation process to change a program-provided address to the memory address associated with the memory element.

5. The memory storage system of claim 1, wherein the memory controller uses translation to rotate a block of data elements so that each row holding part of those data elements holds exactly a first set of bits for that element, and that the next higher sequential row in memory holds the a second set bits from the same data elements, and in the same order.

6. The memory storage system of claim 5, wherein the memory controller reconfigures how memory arrays are arranged so as to minimize memory accesses and reduce overall execution time and power.

7. The memory storage system of claim 1, wherein the memory controller is configured to receives status messages from the one or more ALUs.

8. The memory storage system of claim 1, wherein the memory controller is configured to issue common data and ALU commands to the set of ALUs.

9. The memory storage system of claim 1, wherein the memory controller is configured to issue configuration commands to configure the arrangement of the one or more ALUs.

10. A method of performing memory management comprising:
    providing a memory element that includes a memory address for a physical memory; and
    implementing a memory controller that receives a command for accessing the memory element using a program-generated address and dynamically transforms the program-generated address into the memory address for the physical memory using a rotation module and configuration information, wherein a data word accessed by the physical address is then provided to a set of arithmetic logic units (ALUs) where multiple computations are performed simultaneously so as to reduce program execution time and energy, the configuration information provided to the rotation unit configures the set of ALUs, wherein the rotation module takes a relative element number of the program-generated address and appends it to an unchanged section of lowest bits of the program-generated address.

11. The method of claim 10, wherein the set of ALUs are selected in a program-specifiable option.

12. The method of claim 10, wherein the memory controller maintains a table that is indexed by the number of the set of ALUs used.

13. The method of claim 10, wherein the memory controller uses a translation process to change a program-provided address to the memory address associated with the memory element.

14. The method of claim 10, wherein the memory controller uses translation to rotate a block of data elements so that each row holding part of those data elements holds exactly a first set of bits for that element, and that the next higher sequential row in memory holds the a second set bits from the same data elements, and in the same order.

15. The method of claim 14, wherein the memory controller reconfigures how memory arrays are arranged so as to minimize memory accesses and reduce overall execution time and power.

16. The method of claim 10, wherein the memory controller is configured to receives status messages from the one or more ALUs.

17. The method of claim 10, wherein the memory controller is configured to issue common data and ALU commands to the set of ALUs.

18. The method of claim 10, wherein the memory controller is configured to issue configuration commands to configure the arrangement of the one or more ALUs.

* * * * *